US008876612B2

(12) United States Patent
Mallory

(10) Patent No.: US 8,876,612 B2

(45) **Date of Patent: *Nov. 4, 2014**

(54) REPLACEABLE COSMETIC PANELS FOR MACHINE CABINETS

(75) Inventor: Chester L. Mallory, Reno, NV (US)

(73) Assignee: Stragent, LLC, Longview, TX (US)

( * ) Notice: Subject to any disclaimer, the term of this patent is extended or adjusted under 35 U.S.C. 154(b) by 918 days.

This patent is subject to a terminal disclaimer.

(21) Appl. No.: 13/018,392

(22) Filed: Jan. 31, 2011

(65) Prior Publication Data

US 2011/0124419 A1 May 26, 2011

Related U.S. Application Data

(63) Continuation of application No. 11/861,657, filed on Sep. 26, 2007, now Pat. No. 7,900,922.

(60) Provisional application No. 60/827,031, filed on Sep. 26, 2006.

(51) Int. Cl.

| | |
|---|---|
| ***G06F 17/00*** | (2006.01) |
| ***G07F 17/34*** | (2006.01) |
| ***G07F 17/32*** | (2006.01) |

(52) U.S. Cl.

CPC ............ *G07F 17/34* (2013.01); *G07F 17/3216* (2013.01)

USPC ............ 463/46

(58) Field of Classification Search

USPC ............ 463/20, 46; 273/138.1; 312/7.2, 194, 312/195, 204, 257.1, 265.5, 265.6

See application file for complete search history.

(56) References Cited

U.S. PATENT DOCUMENTS

| | | | | |
|---|---|---|---|---|
| 8,182,347 | B2 * | 5/2012 | Bleich et al. | 463/46 |
| 2007/0054742 | A1 * | 3/2007 | McComb et al. | 463/46 |

* cited by examiner

*Primary Examiner* — Ronald Laneau

(74) *Attorney, Agent, or Firm* — Patrick E. Caldwell, Esq.; The Caldwell Firm, LLC

(57) ABSTRACT

A machine cabinet system is provided. The system includes a machine cabinet with a top face and a front face. In one embodiment, a removable panel is included that is removably coupled to at least one of the top face and the front face of the machine cabinet. In another embodiment, the removable panel is removably coupled to the machine cabinet without use of a tool.

21 Claims, 9 Drawing Sheets

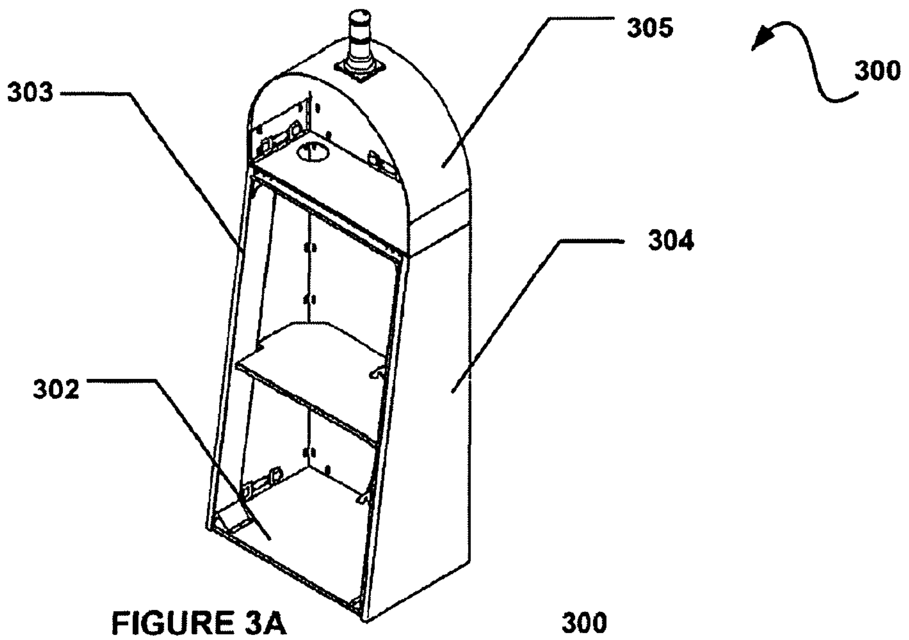
FIGURE 3A
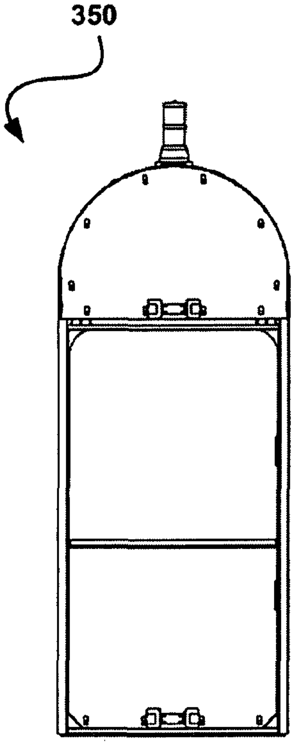
FIGURE 3B
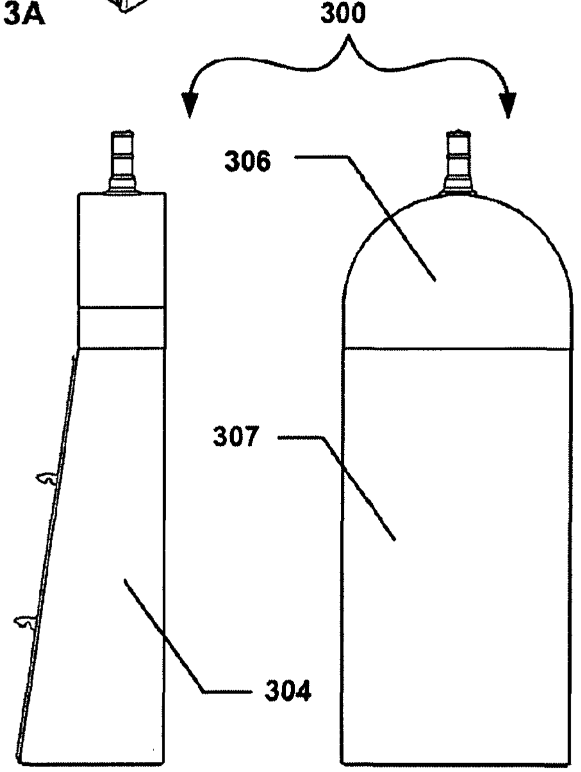
FIGURE 3C
FIGURE 3D 600
608
610
605

613
609
602
611
614

612
602
609

605
602
604

REPLACEABLE COSMETIC PANELS FOR MACHINE CABINETS

RELATED APPLICATION(S)

The present application claims priority from a provisional application filed under Application Ser. No. 60/827,031 on Sep. 26, 2006, which is incorporated herein by reference in its entirety.

BACKGROUND AND FIELD OF THE INVENTION

The present invention relates to machines and, more particularly, machine cabinets and the cosmetic surface finishes applied to such cabinets.

SUMMARY

A machine cabinet system is provided. The system includes a machine cabinet with a top face and a front face. In one embodiment, a removable panel is included that is removably coupled to at least one of the top face and the front face of the machine cabinet. In another embodiment, the removable panel is removably coupled to the machine cabinet without the use of a tool.

BRIEF DESCRIPTION OF THE DRAWINGS

FIGS. 3A-D illustrate an outer side isometric view of a gaming machine cabinet with removable panels installed, in accordance with yet another embodiment.

DETAILED DESCRIPTION

Figure 1:
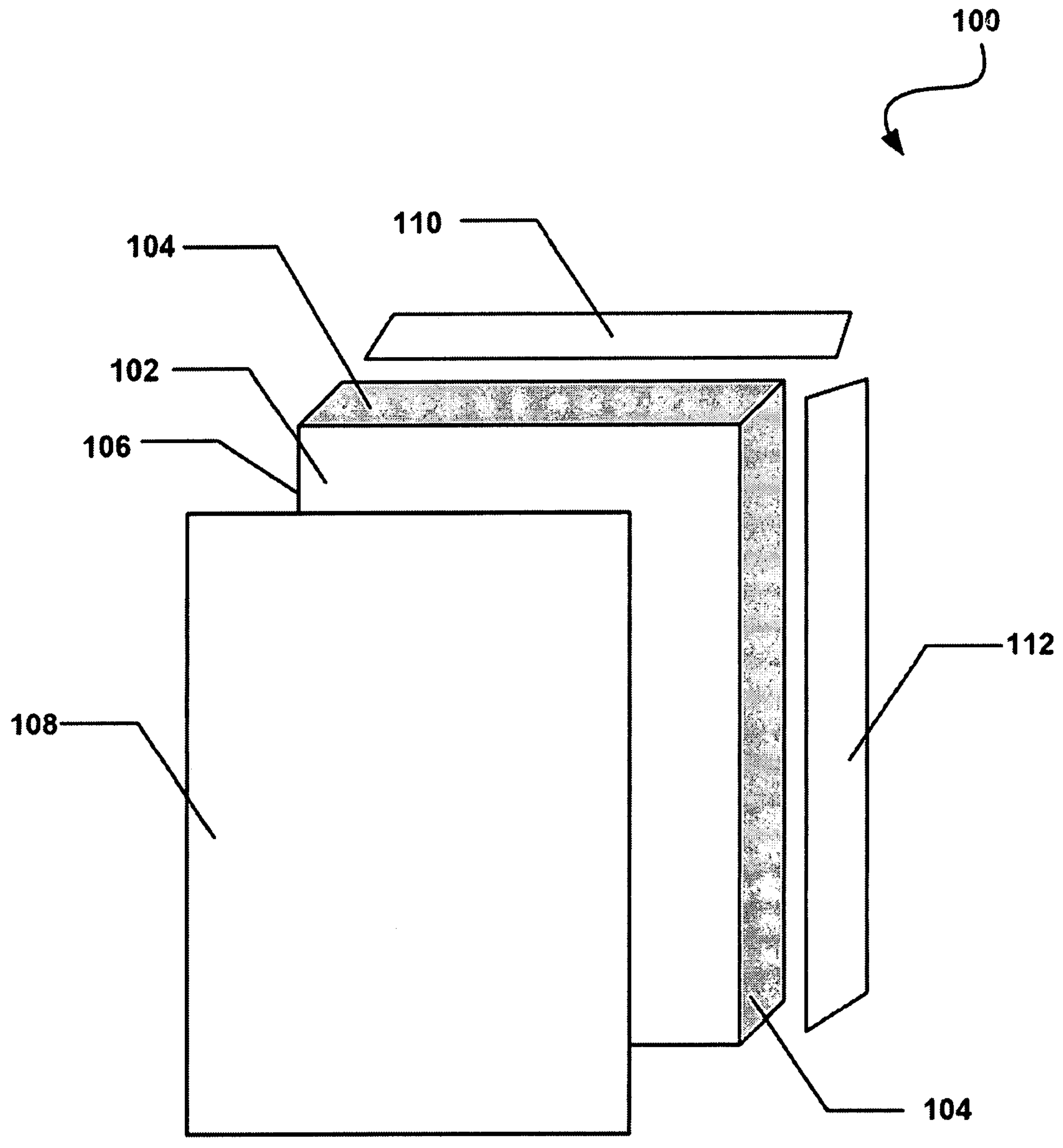
FIG. 1 illustrates a machine cabinet with removed panels, in accordance with one embodiment.

FIG. 1 illustrates a machine cabinet 100 with removed panels, in accordance with one embodiment. In the context of the present description, the machine cabinet may include any housing (e.g. enclosed, unenclosed, etc.) in which components of a machine may reside. For example, the machine cabinet may include a frame inside which the components of the machine reside. Optionally, such machine may include a gaming machine, an engraving machine, a key grinding machine, and/or any other machine in which a component thereof resides in an associated cabinet.

As shown, the machine cabinet 100 includes a front face 102, a top face 104, two side faces 106, a rear face (not shown) and a bottom face (not shown). The faces 102-106 may make up at least a portion of the machine cabinet 100. In addition, such machine cabinet 100 may optionally be made, at least in part, of a metallic material. As shown, each face (e.g. faces 102-106) may be equipped for installing (e.g. affixing, etc.) a removable panel thereon.

In one embodiment, the panels may include metallic material (e.g. stainless steel, etc.). In another embodiment, the panels may be flexible (e.g. capable of conforming to a rounded face of a machine, etc.). In yet another embodiment, the panels may be finished with colored patterns, polished chrome, titanium-nitride, etc. Of course, it should be noted that the panels may include any material capable of being removably installed on the machine cabinet 100.

Thus, in one example, the front face 102 may be equipped to install a front panel 108 thereon. As also shown, the top face 104 may be equipped to install a top panel 110 thereon. Still yet, the two side faces 106 may each be equipped to install side panels 112 thereon. As a result, the panels 108-112 may be installed and removed from the machine cabinet 100 as desired.

In one optional embodiment, two panels may be utilized for affixing to a left face, right face, and top face of the machine cabinet 100. In particular, each panel may be placed over a side face 106 and a portion of the top face 104 of the machine cabinet 100. Thus, the two panels may form a seam on the top face 104 of the machine cabinet 100. In this way, the appearance of a single unified machine cabinet panel may be provided. It should be noted that such optional technique may be utilized with respect to any desired portion of the machine cabinet 100 (e.g. the rear face, etc.).

In this way, panels may be cosmetically placed on the machine cabinet 100. In one example, panels of different themes (e.g. patterns, colors, etc.) may be interchanged per the decorative desires of a user. In another example, new panels may be interchanged for old panels. Thus, versatility of machine aesthetics may be provided.

Figure 2:
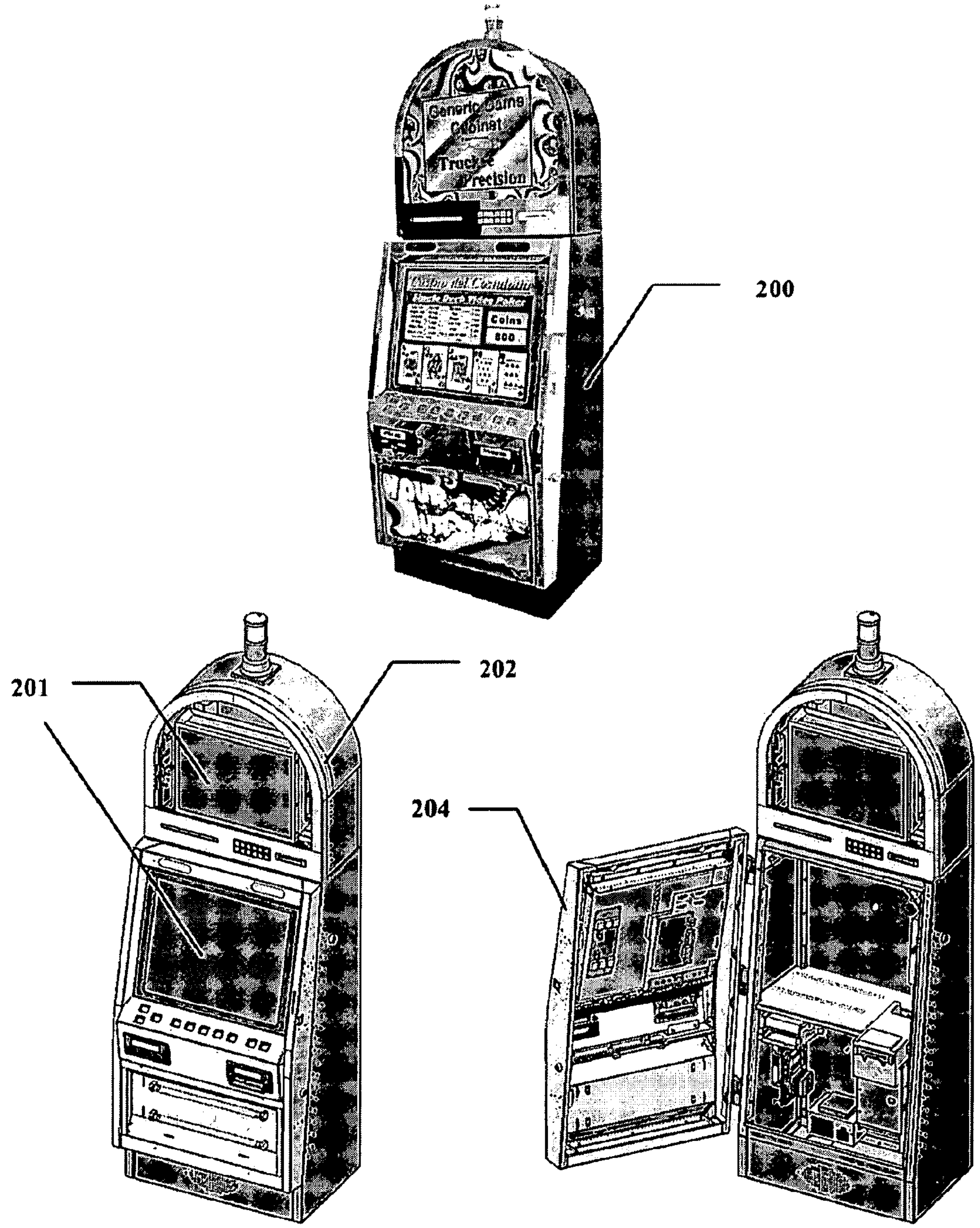
FIG. 2 illustrates a perspective view of a gaming machine with components installed in a cabinet of the gaming machine, in accordance with another embodiment.

FIG. 2 illustrates a perspective view of a gaming machine 200 with components installed in a cabinet of the gaming machine, in accordance with another embodiment. As an option, the gaming machine 200 may be implemented in the context of the machine cabinet 100 of FIG. 1. Of course, the gaming machine 200 may be implemented utilizing any desired architecture. Further, the aforementioned definitions may equally apply to the description below.

As shown, a plurality of displays 201 are installed in the gaming machine 200. In one embodiment, the displays 201 may include digitally controlled displays. Of course, however, the displays 201 may include any type of displays capable of displaying data.

In addition, the displays 201 may be utilized for presenting game play odds. As another option, the displays 201 may be utilized for displaying a game being played on the gaming machine 200. It should be noted, however, that the displays may display any desired data.

Further, an external housing 202 is provided with a front face, rear face, two side faces and an arcuate top face. Also included is a door 204 hingably coupled to the external housing 202 near the front face thereof. In use, the door 204 swings between an open orientation and a closed orientation. While not shown, it should be understood that the door 204 may be equipped with an electronic gaming assembly for displaying a game through a front transparent panel of the door 204.

In the context of the present description, the gaming assembly may include any type of input and/or output device used in association with the gaming machine 200. Such gaming assembly may be coupled to the door 204 such that access is provided to the gaming assembly when the door 204 is in the open orientation. Further, in the context of the present description, the term coupling assembly may refer to absolutely any coupling, link and/or any other assembly capable of allowing release of at least a portion of the door 204.

It should be noted that any additional aspects may be included in the gaming machine 200. For example, player buttons may be included for allowing a player to control operation of gaming machine 200. As another example, a coin acceptor, a bill acceptor, and a coin tray may also be provided for receiving money from and presenting money to such player.

FIGS. 3A-D illustrate outer side isometric views of a machine cabinet 300 and 350 with removable panels installed and removed, in accordance with yet another embodiment. As an option, the machine cabinet 300, 350 may be implemented in the context of FIG. 1 and/or 2. Of course, the machine cabinet 300, 350 may be implemented utilizing any desired architecture. Again, the aforementioned definitions may equally apply to the description below.

As shown in FIGS. 3A, 3C, and 3D, the machine cabinet 300 includes two removable side panels 303 and 304 installed thereon. In one embodiment (as shown), the two removable side panels 303 and 304 are substantially planar. Thus, the two removable side panels 303 and 304 may be installed as planar sides to the machine cabinet 300. Of course, however, the two removable side panels 303 and 304 may be of any desired shape capable of being installed on a machine.

Also included in the machine cabinet 300 is a bottom panel 302. The bottom panel 302 may optionally be a permanent installation of the machine cabinet 300. Thus, the bottom panel 302 may be welded, bolted, etc. to the machine cabinet 300.

In addition, the machine cabinet 300 may include a top panel 305, as shown. The top panel 305 may include an arcuate surface. In this way, the top panel 305 may be installed on a rounded top portion of a machine. Again, it should be noted that the top panel 305 may be of any desired shape capable of being installed on a machine.

Further, the machine cabinet 300 includes a top portion 306 of a back panel and a bottom portion 307 of the back panel. The top portion 306 and the bottom portion 307 of the back panel may also include substantially planar surfaces, as shown. As a result, the top portion 306 and the bottom portion 307 of the back panel may be installed as planar sides to the machine cabinet 300. Again, the top portion 306 and the bottom portion 307 of the back panel may also be of any desired shape capable of being installed on a machine cabinet 300.

Each of the top portion 306 and the bottom portion 307 of the back panel may optionally be removable with respect to the machine cabinet 300. For example, if the machine cabinet 300 is associated with a stand-alone machine, then the top portion 306 and the bottom portion 307 of the back panel may be removable. As another example, if the machine cabinet 300 is associated with a machine that is back-to-back with another machine, then the top portion 306 and the bottom portion 307 of the back panel may be permanently installed on the machine cabinet 300 or replaced with a less costly spacer panel.

As shown in FIG. 3B, the panels of the machine cabinet 350 may be removed. In one embodiment, removal of the panels may show the inside architecture, such as the components, of the machine cabinet 350. In another embodiment, removal of the panels may show an underlying machine cabinet. More information on techniques for installing and removing the panels will be described in more detail with respect to FIG. 4.

Figure 4:
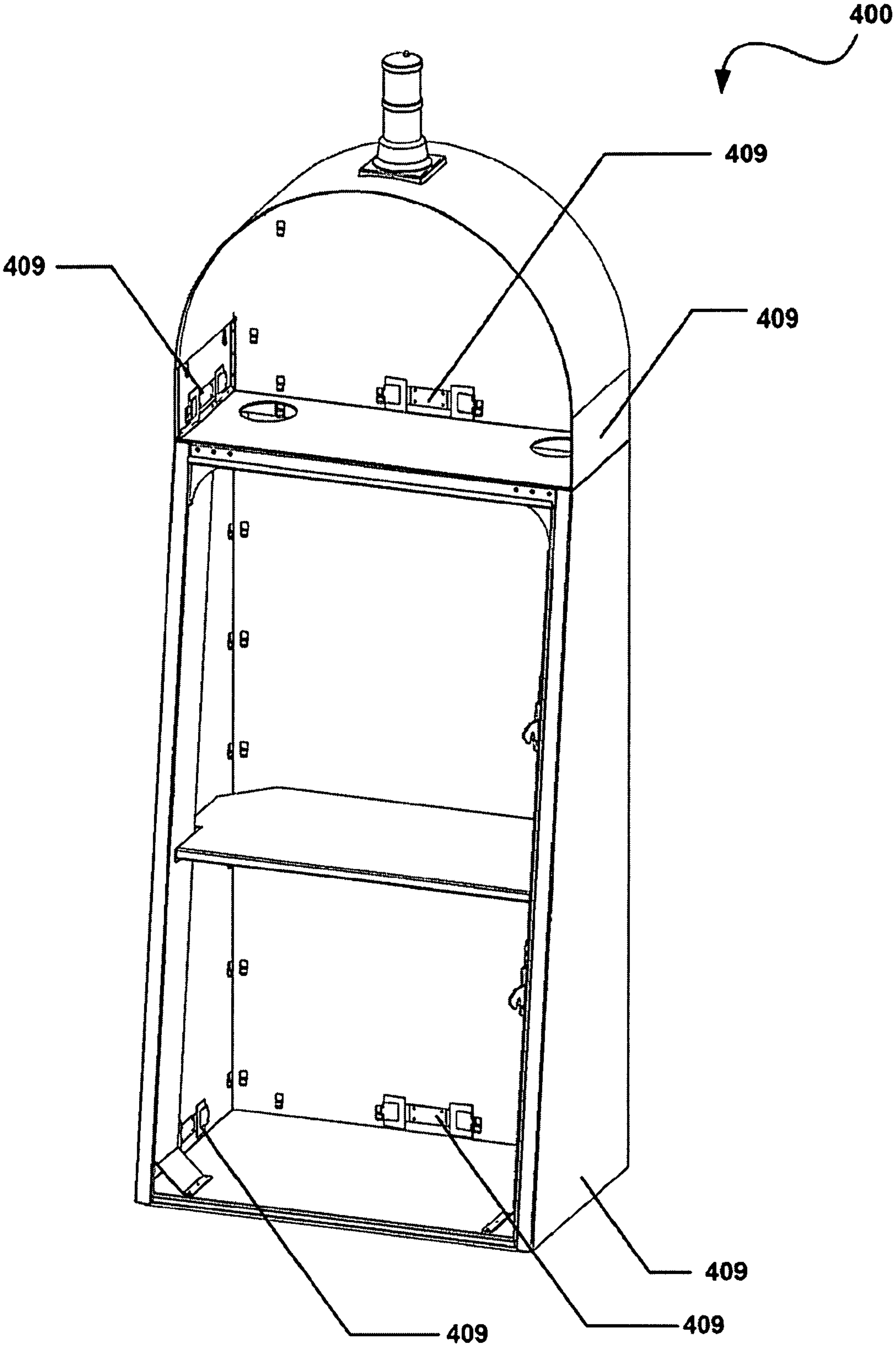
FIG. 4 illustrates an outer side perspective view of a gaming machine cabinet with removable panels installed, in accordance with still yet another embodiment.

FIG. 4 illustrates an outer side perspective view of a machine cabinet 400 with removable panels installed, in accordance with still yet another embodiment. As an option, the machine cabinet 400 may be implemented in the context of FIGS. 1-3D. Of course, the machine cabinet 400 may be implemented utilizing any desired architecture. Further, the aforementioned definitions may equally apply to the description below.

As shown, the machine cabinet 400 includes side, top and back panels installed thereon. The panels may be installed onto the machine cabinet 400 utilizing a plurality of clips 409. In one embodiment, the clips 409 may include spring clips that snap into position when each panel is properly located on the machine cabinet 400. Thus, a tool-less mechanism may be used to securely lock the panels into position with respect to the machine cabinet 400.

In addition, the clips 409 may consist of a metallic material. The clips may optionally be located on the outer edges of the panels such that at least a portion of the outer edges of the panels are affixed to the machine cabinet 400 via the clips 409. More information with respect to examples of such clips 409 and the functionality of such clips 409 will be provided in greater detail with respect to FIGS. 6A-D. Of course it should be noted, however, that any desired mechanism may be utilized for installing the panels to the machine cabinet 400.

Just by way of example, in another embodiment, the panels may be installed on the machine cabinet 400 by bolting the panels to the machine cabinet 400. Optionally, the panels may be attached to the machine cabinet 400 utilizing threaded studs attached to such panels. In particular, the threaded studs may be inserted into openings of the machine cabinet 400 and may be secured thereto utilizing nuts screwed onto such threaded studs from the inside of the machine cabinet 400.

In yet another embodiment, the panels may be installed on the machine cabinet 400 utilizing studs and locking nuts. Optionally, the studs and locking nuts may be spaced a material thickness away from each panel for affixing the panels to the machine cabinet 400. Still yet, weld studs may be utilized for installing the panels to the machine cabinet 400. Such weld studs may be utilized for preventing exterior marking of the machine cabinet 400. Again, it should be noted that such various embodiments of installing the panels are just by way of example only, and that any desired mechanism capable of installing the panels to the machine cabinet 400 may be utilized.

Figure 5A:
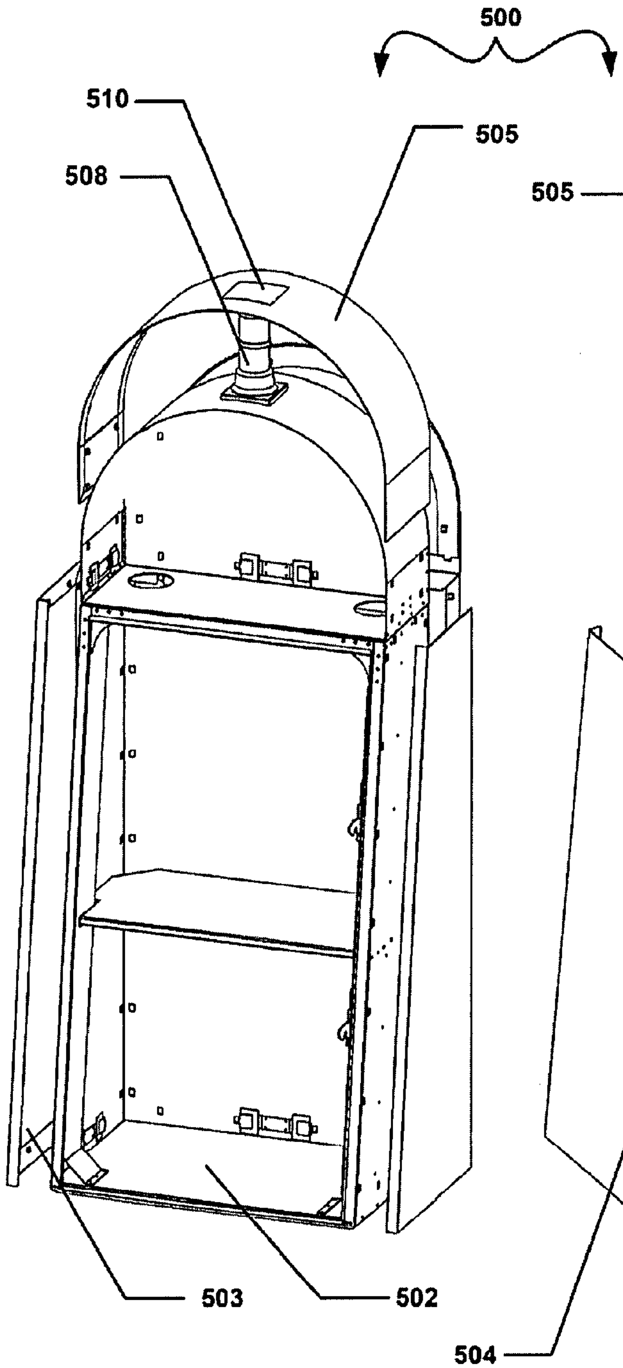
FIGS. 5A-B illustrate a perspective view of a gaming machine cabinet with removed panels that accommodate permanent fixtures, in accordance with another embodiment.
Figure 5B:
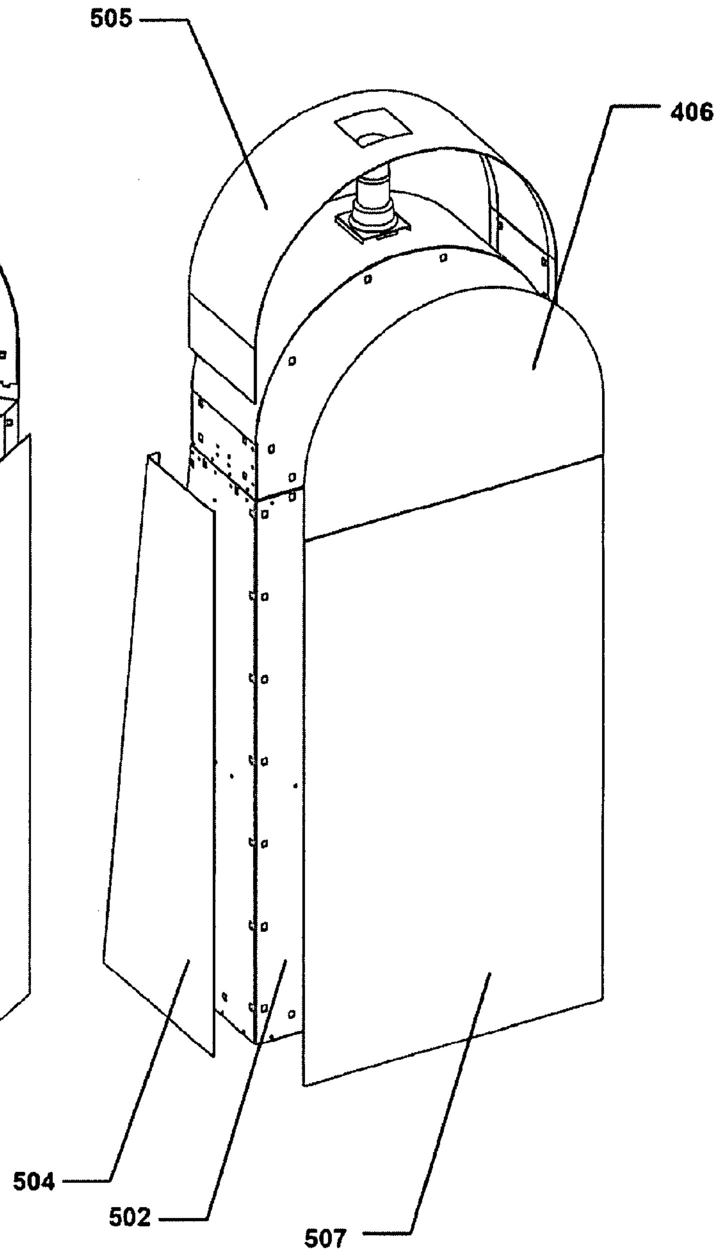

FIGS. 5A-B illustrate a perspective view of a machine cabinet 500 with removed panels that accommodate permanent fixtures, in accordance with another embodiment. As an option, the machine cabinet 500 may be implemented in the context of FIGS. 1-4. Of course, the machine cabinet 500 may be implemented utilizing any desired architecture. Again, the aforementioned definitions may equally apply to the description below.

As shown, a plurality of panels 503-507 is removed from the machine cabinet 500. The panels 503-507 may optionally include full hems (e.g. corners capable of wrapping around corners of the machine cabinet 500, etc.), for example. Such full hems (as shown) may facilitate the secure installation of the panels 503-507 on the machine cabinet 500.

An underlying machine cabinet 502 to which the panels 503-507 may be affixed is also shown. The underlying machine cabinet 502 may be made of any desired material (e.g. metal, etc.). The underlying machine cabinet 502 may include recesses corners for allowing the full hems of the panels 503-507 to attach thereto. In addition, the underlying machine cabinet 502 may include mechanisms (e.g. openings to engage clips, etc.) for affixing the panels 503-507 to the machine cabinet 500. Such mechanisms will be described in more detail with respect to FIGS. 6A-D.

Moreover, the top panel 505 may include an opening 510 to accommodate a light tower 508 of the machine cabinet 500. In one embodiment, the opening 510 may include a cutout that fits around such light tower 508. In particular, the cutout may be sized according to the light tower 508 such that complete coverage of the underlying machine cabinet 502 may be maintained.

It should be noted that any of the panels 503-507 may include openings, such as that described herein, for protruding aspects of the machine cabinet 500. In addition, the panels 503-507 may include openings for other aspects of the machine cabinet 500. Just by way of example, at least one of the panels 503-507 may include an opening for viewing a serial number tag affixed to the underlying machine cabinet 502. As another example, at least one of the panels 503-507 may include an opening for a vent which may allow exhaust fans to be utilized with respect to the machine cabinet 500.

FIGS. 6A-D illustrate detail views of removable panels located on a machine cabinet 600, including an attachment, latching mechanism, close-up view of a corner construction, and an accommodation of protruding items permanently attached to the cabinet, in accordance with yet another embodiment. As an option, the machine cabinet 600 may be implemented in the context of FIGS. 1-5B. Of course, the machine cabinet 600 may be implemented utilizing any desired architecture. Again, the aforementioned definitions may equally apply to the description below.

As shown, removable panels 603-605 may be installed on an underlying machine cabinet 602. In one embodiment, the panels 603-605 may be installed utilizing openings 611 located on the underlying machine cabinet 602. In particular, the openings 611 may coincide with mounting tabs 612 located on the panels 603-605.

Figures 6A, 6B, 6C, 6D:
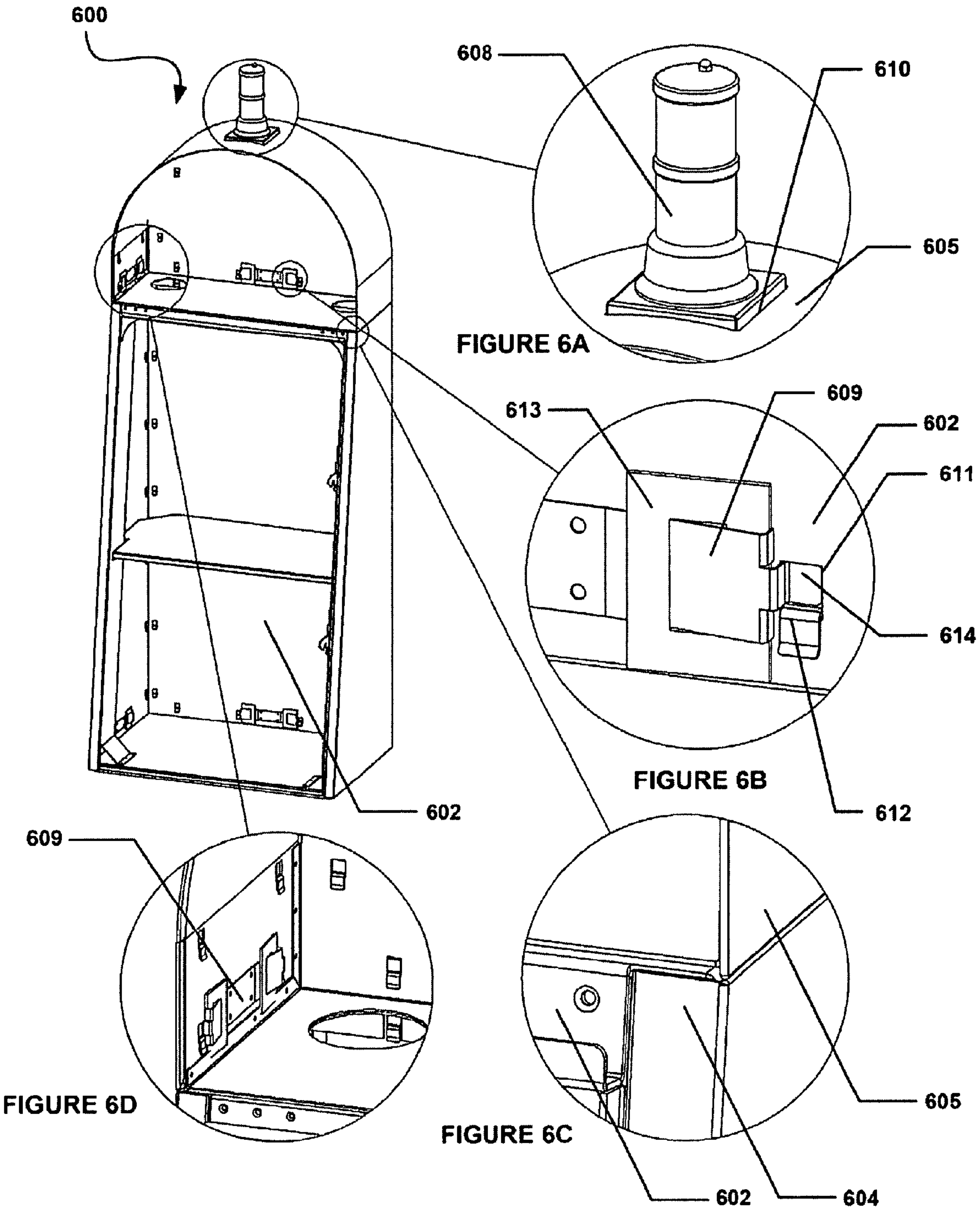
FIGS. 6A-D illustrate detail views of removable panels located on a gaming machine cabinet, including an attachment, latching mechanism, close-up view of a corner construction, and an accommodation of protruding items permanently attached to the cabinet, in accordance with yet another embodiment.

As shown in FIG. 6B, a panel 603-605 may be installed on the underlying machine cabinet 602 by aligning the tabs 512 of the panel 603-605 with the openings 611 of the underlying machine cabinet 602. Once aligned, the panel 603-605 may be placed in contact with the underlying machine cabinet 602. The tabs 612 may then engage the underlying machine cabinet 602 through the openings 611, such that the associated panel is securely affixed to the underlying machine cabinet 602.

In addition, as shown in FIGS. 6B and 6D, a locking mechanism may be utilized to securely lock the panels 603-605 to the underlying machine cabinet 602. The locking mechanism may include a spring clip 609 that is secured to the underlying machine cabinet 602. As will be described, the spring clip 609 may engage to the opening 611 of the underlying machine cabinet 602 to secure the tab 612 of the panel 603-605 in the opening 611.

A lock actuator 613 may be initially positioned parallel to the face of the underlying machine cabinet 602, as shown in FIG. 6B. A panel 603-605 may then be positioned onto the underlying machine cabinet 602 and moved into the final mounted location utilizing the opening 611 and the tab 612 of the panel 603-605, as described above. A locking tab 614 associated with the lock actuator 613 may be pushed out of the way by the tab 612 of the panel 603-605 as the panel is installed on the underlying machine cabinet 602.

Once the panel 602-603 is installed, the tab 612 of the panel 603-605 and the locking tab 612 will be automatically placed in a locked position, as shown in the FIG. 6B. In particular, neither the tab 612 of the panel 603-605 nor the locking tab 614 may be capable of being removed from the opening 611. In this way, a simple, tool-less mechanism may be utilized for locking panels onto an underlying machine cabinet 602 while maintaining a clean (e.g. substantially hardwareless, etc.) aspect to the machine cabinet 600.

In order to remove the panel 603-605 from the underlying machine cabinet 602, the actuator 613 is rotated perpendicular to the face of the underlying machine cabinet 602. Accordingly, the spring clip 609 is positioned clear of the opening 611, and therefore clear of the tab 612 of the panel 603-605. Thus, rotating the actuator 613 in such a manner will pull the locking tab 614 out of engagement with the tab 612 of the panel 603-605, by freeing any interference by the locking tab 614 with the opening 611.

With the actuator 613 perpendicular to the face of the underlying machine cabinet 602, and thus in the unlocked position, the panel 603-605 may be moved upward to disengage the tab 612 of the panel 603-605 from the opening 611. Optionally, the actuator 613 may then be repositioned into the locked position (i.e. parallel to the face of the underlying machine cabinet 602). In this way, the simple, tool-less mechanism may also be utilized for unlocking panels from the underlying machine cabinet 602.

Consequently, the external cosmetic surfaces of machines may be easily replaced due to damage or unsightliness thereof. Such replacement may therefore eliminate the need for machines to be removed their environment in order to be cosmetically refurbished (e.g. permanently painted, powder coated, laminated, etc.). Moreover, costs associated with materials, labor, and lost revenues from the non-operational status of the machine may be prevented.

Further, machines that utilize server based components, where a single machine is capable of providing a wide variety of functionality, may remain in service for a much longer period of time than they would without removable panels. For example, the useful life of cabinets associated with such server based machines may substantially increase by allowing the interchange of panels based on the particular function currently allowed by the machine. In addition, information, such as winning odds, required by governmental regulations to be printed on the machine cabinets may also easily changed according to the particular functionality (e.g. game, etc.) currently enabled by simply interchanging the removable panels.

Figure 7:
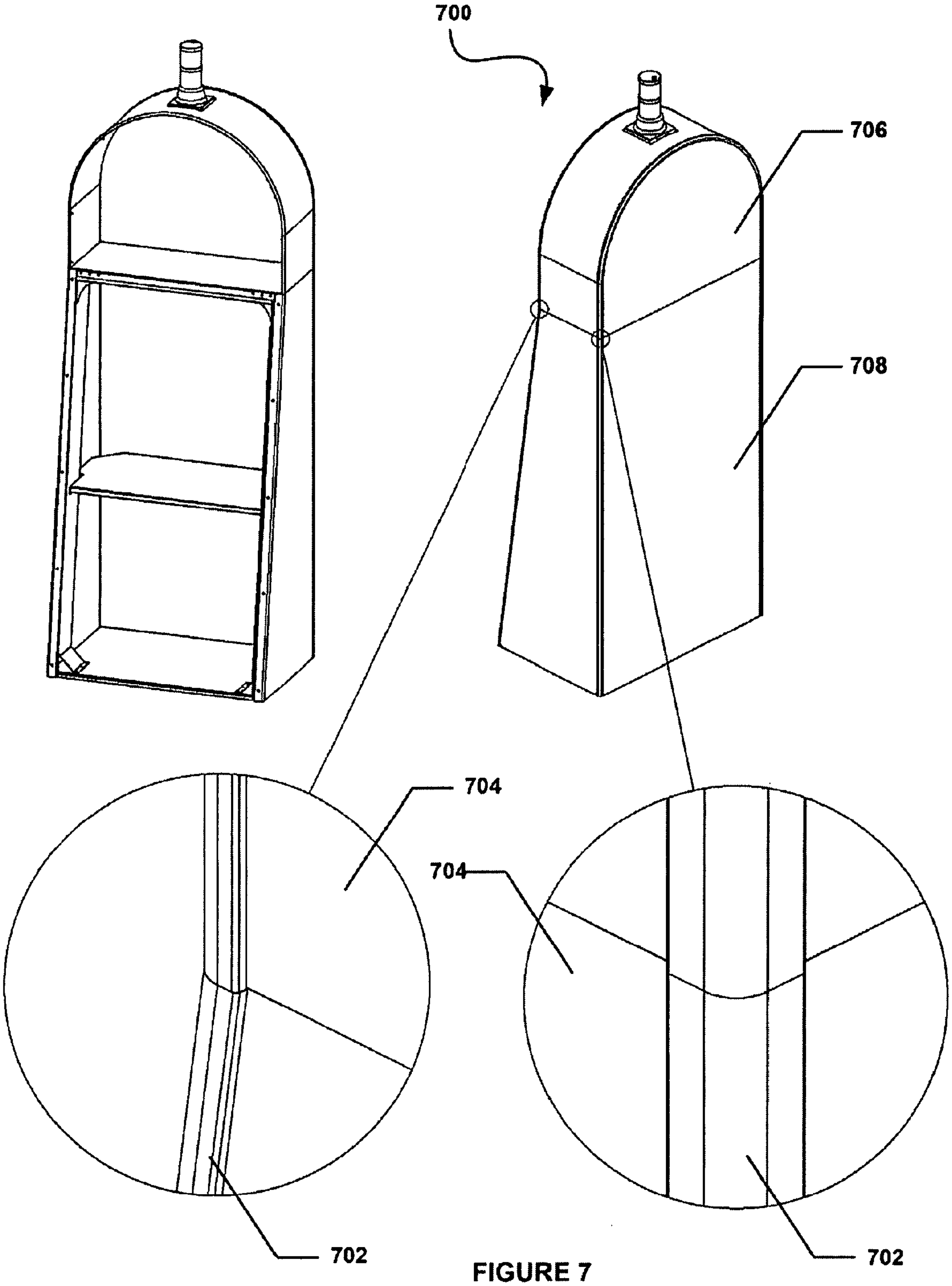
FIG. 7 illustrates removable panels installed on a gaming machine cabinet utilizing extrusions of the gaming machine cabinet, in accordance with still yet another embodiment.

FIG. 7 illustrates removable panels installed on a machine cabinet 700 utilizing extrusions of the machine cabinet, in accordance with still yet another embodiment. As an option, the machine cabinet 700 may be implemented in the context of FIGS. 1-6D. Of course, the machine cabinet 700 may be implemented utilizing any desired architecture. Again, the aforementioned definitions may equally apply to the description below.

As shown, the machine cabinet 700 may include extrusions 702 located thereon. The extrusions 702 may include any desired material (e.g. metal, etc.). For example, the extrusions 702 may include material that is the same and/or different than material associated with removable panels 704 installed on the machine cabinet 700.

In addition, the extrusions 702 may be located on corners (e.g. edges, etc.) of the machine cabinet 700. In another embodiment, the extrusions 702 may be located on seams of the machine cabinet 700 (e.g. between the top portion 706 and bottom portion 708 of the machine cabinet 700, etc.). Of course, however, the extrusions 702 may be located on any portion of the machine cabinet 700. Thus, architectural detail may be added to the edges, seams, etc. of the machine cabinet 700 utilizing extrusions 702.

In one embodiment, edges of the extrusions 702 may be rounded, for providing rounded edges to the machine cabinet 700. In another embodiment, the extrusions 702 themselves may be curved, for being placed on a curved edge of the machine cabinet 700 (e.g. an edge of the curved top portion 706 of the machine cabinet 700, etc.). It should be noted, however, that the extrusions 702 may be of any desired shape and/or size, as desired.

Accordingly, the extrusions 702 may include any type of plate capable of being fastened to the machine cabinet 700. More information on how such extrusions 702 may be fastened to the machine cabinet 700 will be described in more detail below with respect to FIG. 9. Further, the extrusions 702 may be capable of affixing removable panels to the machine cabinet 700. Again, more information on how such removable panels may be affixed to the machine cabinet 700 utilizing the extrusions 702 will be described in more detail below with respect to FIG. 8.

Figure 8:
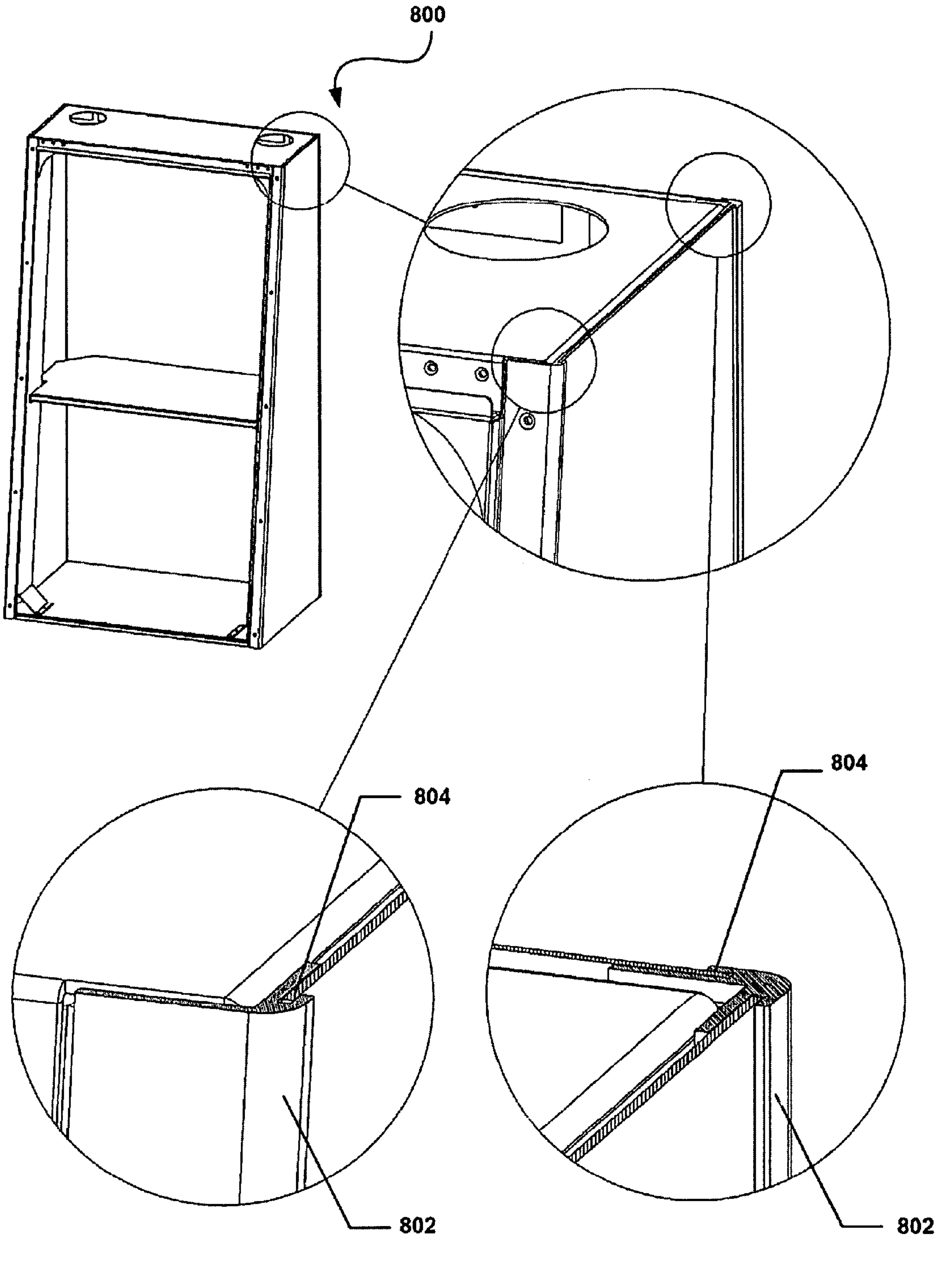
FIG. 8 illustrates a detail view of removable panels installed on a gaming machine cabinet utilizing slots associated with extrusions of the gaming machine cabinet, in accordance with another embodiment.

FIG. 8 illustrates a detail view of removable panels installed on a machine cabinet 800 utilizing slots associated with extrusions of the machine cabinet, in accordance with another embodiment. As an option, the machine cabinet 800 may be implemented in the context of FIGS. 1-7. Of course, the machine cabinet 800 may be implemented utilizing any desired architecture. Again, the aforementioned definitions may equally apply to the description below.

As shown, the extrusions 802 may include slots 804. In addition, the extrusions 802 may include slots 804 on at least two edges thereof. In particular, each slot 804 may retain an edge of a removable panel. In this way, the extrusions 802 may be utilized for retaining removable panels therein.

In this way, each extrusion 802 may be capable of retaining at least a portion of each of two separate removable panels. For example, each extrusion 802 may optionally affix edges of two removable panels to two sides of the machine cabinet 800, respectively, in which the extrusion 802 intersects. Accordingly, a plurality of extrusions 802, located on a plurality of corners and/or seams of the machine cabinet 800, may be utilized for affixing removable panels to the machine cabinet 800.

Figure 9:
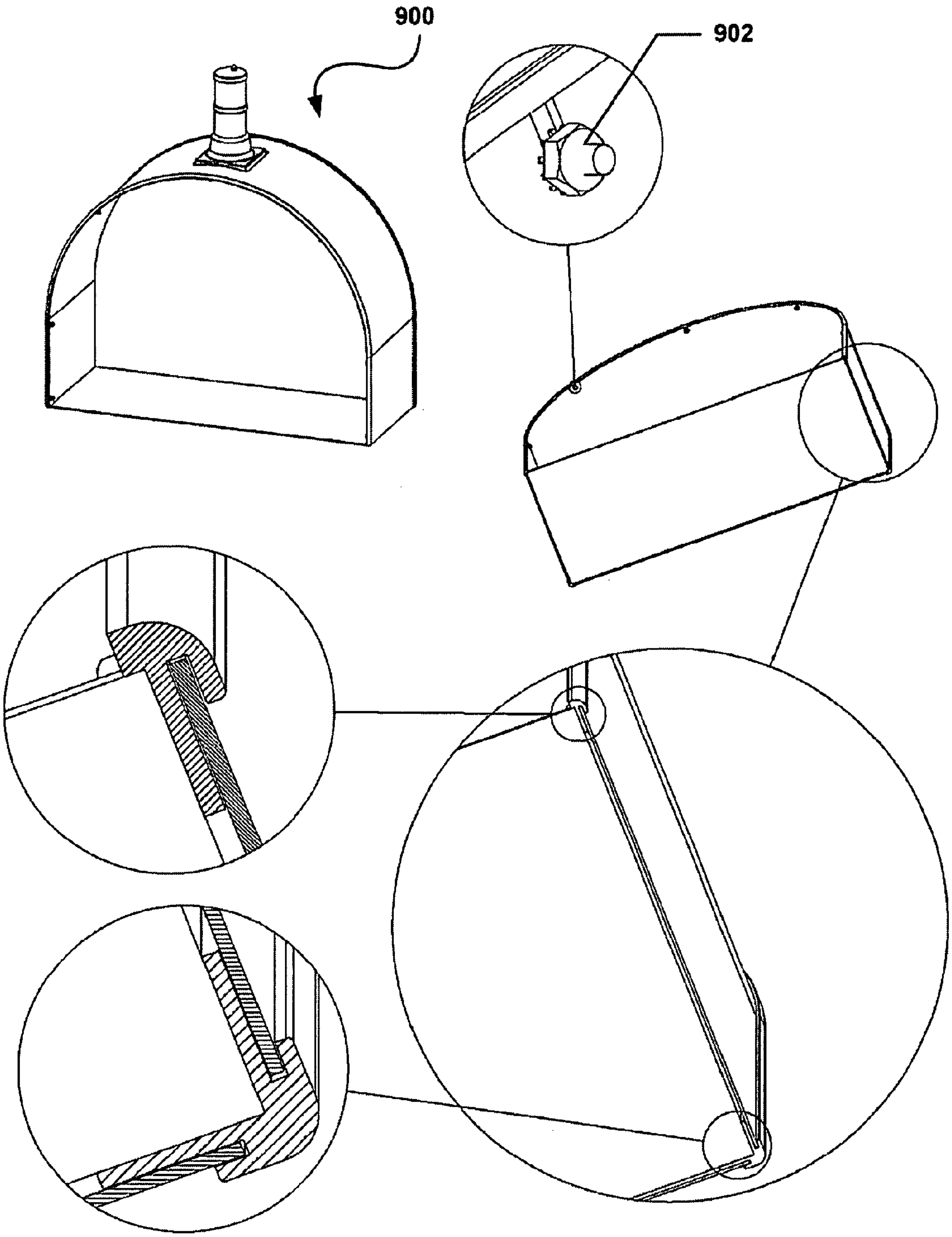
FIG. 9 illustrates a detail view of removable panels installed on a gaming machine cabinet utilizing extrusions fastened to the gaming machine cabinet by way of screws, in accordance with yet another embodiment.

FIG. 9 illustrates a detail view of removable panels installed on a machine cabinet 900 utilizing extrusions fastened to the machine cabinet by way of screws, in accordance with yet another embodiment. As an option, the machine cabinet 900 may be implemented in the context of FIGS. 1-8. Of course, the machine cabinet 900 may be implemented utilizing any desired architecture. Again, the aforementioned definitions may equally apply to the description below.

As shown, the extrusions 902 may be fastened to the machine cabinet 900 utilizing screws 904. In particular, each extrusion 902 may be fastened to the machine cabinet 900 via a plurality of screws 904 spatially separated along an edge, seam, etc. of the machine cabinet 900. Of course it should be noted, however, that the extrusions 902 may be fastened to the machine cabinet 900 in any desired manner.

In one embodiment, removable panels may be installed on the machine cabinet 900 by inserting the panels into slots of the extrusions 902 prior to fastening the extrusions 902 to the machine cabinet 900. In another embodiment, the removable panels may be installed on the machine cabinet 900 by inserting the panels into slots of at least one extrusion 902 fastened to the machine cabinet 900. For example the removable panels may be slid into slots of at least one extrusion 902 fastened to the machine cabinet 900, whereby other unfastened extrusions 902 may then be subsequently fastened to the machine cabinet 900 after placing an edge of the partially retained panel into a slot thereof.

In yet another embodiment, the extrusions 902 may be unfastened (e.g. unscrewed, etc.) from the machine cabinet 900 in order to remove the panels affixed thereto. Optionally, a door and/or other opening to the machine cabinet 900 may be utilized for accessing the screws (and/or any other hardware) utilized to fasten the extrusions 902 to the machine cabinet 900. In this way, panels may be installed and removed from the machine cabinet 900.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A gaming machine system, comprising:

a gaming machine cabinet including a top face, a first side face, a second side face, a back face, and a front face that are configured such that the top face, the first side face, the second side face, and the back face form a gaming machine cabinet enclosure;

said gaming machine cabinet further including a light tower protruding upwardly from the top face thereof;

said gaming machine cabinet further including a plurality of cabinet coupling mechanisms associated with one or more of the top face, the first side face, the second side face, and the back face; and a removable cosmetic gaming machine panel manufactured to include a top panel portion, a first side panel portion, a second side panel portion, and a back panel portion, wherein at least part of one or more of the top panel portion, the first side panel portion, the second side panel portion, and the back panel portion form seams with respect to each other so that the removable cosmetic gaming machine panel is adapted for being removably coupled over the gaming machine cabinet enclosure to provide a cosmetic appearance of a gaming machine cabinet panel with a predetermined appearance;

said removable cosmetic gaming machine panel further including a plurality of panel coupling mechanisms associated with one or more of the top panel portion, the first side panel portion, the second side panel portion, and the back panel portion, for being removably coupled to the cabinet coupling mechanisms of the gaming machine cabinet to secure the removable cosmetic gaming machine panel to the gaming machine cabinet;

said top panel portion of the removable cosmetic gaming machine panel further including a top light tower opening for allowing the light tower of the gaming machine cabinet to pass therethrough.

2. The system of claim 1, wherein the removable cosmetic gaming machine panel is flexible.

3. The system of claim 1, wherein the top face of the gaming machine cabinet is rounded, and the removable cosmetic gaming machine panel is removably coupled to the rounded top face of the gaming machine cabinet.

4. The system of claim 1, wherein removal of the removable cosmetic gaming machine panel does not show an inside architecture of a gaming machine associated with the gaming machine cabinet.

5. The system of claim 1, wherein the top panel portion of the removable cosmetic gaming machine panel further includes a vent opening for allowing air flow with respect to the gaming machine cabinet.

6. The system of claim 1, wherein at least one panel portion of the removable cosmetic gaming machine panel further includes an indicia opening for allowing view of indicia on the gaming machine cabinet.

7. The system of claim 1, wherein the cabinet coupling mechanisms include apertures.

8. The system of claim 1, wherein the panel coupling mechanisms include threaded mechanisms.

9. A gaming machine method, comprising:

providing a gaming machine cabinet including a top face, a first side face, a second side face, a back face, and a front face that are configured such that the top face, the first side face, the second side face, and the back face form a gaming machine cabinet enclosure; said gaming machine cabinet further including a light tower protruding upwardly from the top face thereof; said gaming machine cabinet further including a plurality of coupling cabinet coupling mechanisms associated with one or more of the top face, the first side face, the second side face, and the back face; and removably coupling, to the gaming machine cabinet, a removable cosmetic gaming machine panel including a top panel portion, a first side panel portion, a second side panel portion, and a back panel portion, wherein at least part of one or more of the top panel portion, the first side panel portion, the second side panel portion, and the back panel portion form seams with respect to each other so that the removable cosmetic gaming machine panel is adapted for being removably coupled over the gaming machine cabinet enclosure to provide a cosmetic appearance of a gaming machine cabinet panel with a predetermined appearance; said removable cosmetic gaming machine panel further including a plurality of panel coupling mechanisms associated with one or more of the top panel portion, the first side panel portion, the second side panel portion, and the back panel portion, for being removably coupled to the cabinet coupling mechanisms of the gaming machine cabinet to secure the removable cosmetic gaming machine panel to the gaming machine cabinet; said top panel portion of the removable cosmetic gaming machine panel further including a top light tower opening for allowing the light tower of the gaming machine cabinet to pass therethrough.

10. The method of claim 9, wherein the removable cosmetic gaming machine panel is flexible.

11. The method of claim 9, wherein the top face of the gaming machine cabinet is rounded, and the removable cosmetic gaming machine panel is removably coupled to the rounded top face of the gaming machine cabinet.

12. The method of claim 9, wherein removal of the removable cosmetic gaming machine panel does not show an inside architecture of a gaming machine associated with the gaming machine cabinet.

13. The method of claim 9, wherein the top panel portion of the removable cosmetic gaming machine panel further includes a vent opening for allowing air flow with respect to the gaming machine cabinet.

14. The method of claim 9, wherein at least one panel portion of the removable cosmetic gaming machine panel further includes an indicia opening for allowing view of indicia on the gaming machine cabinet.

15. A gaming machine system, comprising:

a gaming machine cabinet including a top face, a first side face, a second side face, a back face, and a front face that are configured such that the top face, the first side face, the second side face, and the back face form a gaming machine cabinet enclosure;

said gaming machine cabinet further including a tower protruding upwardly from the top face thereof;

said gaming machine cabinet further including a plurality of cabinet coupling mechanisms associated with one or more of the top face, the first side face, the second side face, and the back face; and a removable cosmetic gaming machine panel manufactured to include a top panel portion, a first side panel portion, a second side panel portion, and a back panel portion, wherein at least part of one or more of the top panel portion, the first side panel portion, the second side panel portion, and the back panel portion form seams with respect to each other so that the removable cosmetic gaming machine panel is adapted for being removably coupled over the gaming machine cabinet enclosure to provide a cosmetic appearance of a gaming machine cabinet panel with a predetermined appearance;

said removable cosmetic gaming machine panel further including a plurality of panel coupling mechanisms associated with one or more of the top panel portion, the first side panel portion, the second side panel portion, and the back panel portion, for being removably coupled to the cabinet coupling mechanisms of the gaming machine cabinet to secure the removable cosmetic gaming machine panel to the gaming machine cabinet, wherein an exterior appearance of the removable cosmetic gaming machine panel is devoid of exterior markings associated with the panel coupling mechanisms for cosmetic purposes;

said top panel portion of the removable cosmetic gaming machine panel further including a top tower opening for allowing the tower of the gaming machine cabinet to pass therethrough.

16. A gaming machine system, comprising:

a gaming machine cabinet including a top face, a first side face, a second side face, a back face, and a front face that are configured such that the top face, the first side face, the second side face, and the back face form a gaming machine cabinet enclosure;

said gaming machine cabinet further including a plurality of cabinet coupling mechanisms associated with one or more of the top face, the first side face, the second side face, and the back face; and a removable cosmetic gaming machine panel manufactured to include a top panel portion, a first side panel portion, a second side panel portion, and a back panel portion, wherein at least part of one or more of the top panel portion, the first side panel portion, the second side panel portion, and the back panel portion form seams with respect to each other so that the removable cosmetic gaming machine panel is adapted for being removably coupled over the gaming machine cabinet enclosure to provide a predetermined cosmetic appearance;

said removable cosmetic gaming machine panel further including a plurality of panel coupling mechanisms associated with one or more of the top panel portion, the first side panel portion, the second side panel portion, and the back panel portion, for being removably coupled to the cabinet coupling mechanisms of the gaming machine cabinet to secure the removable cosmetic gaming machine panel to the gaming machine cabinet.

17. The system of claim 16, wherein the removable cosmetic gaming machine panel is flexible.

18. The system of claim 16, wherein the top face of the gaming machine cabinet is rounded, and the removable cosmetic gaming machine panel is removably coupled to the rounded top face of the gaming machine cabinet.

19. The system of claim 16, wherein removal of the removable cosmetic gaming machine panel does not show an inside architecture of a gaming machine associated with the gaming machine cabinet.

20. The system of claim 16, wherein the top panel portion of the removable cosmetic gaming machine panel further includes a vent opening for allowing air flow with respect to the gaming machine cabinet.

21. The system of claim 16, wherein at least one panel portion of the removable cosmetic gaming machine panel further includes an indicia opening for allowing view of indicia on the gaming machine cabinet.

* * * * *